United States Patent
Sabin et al.

(10) Patent No.: US 8,595,647 B2
(45) Date of Patent: Nov. 26, 2013

(54) SYSTEM AND METHOD FOR PROVIDING DYNAMIC PRIORITIZATION AND IMPORTANCE FILTERING OF COMPUTER DESKTOP ICONS AND PROGRAM MENU ITEMS

(75) Inventors: Jason Allen Sabin, Pleasant Grove, UT (US); Jeremy Ray Brown, Orem, UT (US)

(73) Assignee: Novell, Inc., Provo, UT (US)

( * ) Notice: Subject to any disclaimer, the term of this patent is extended or adjusted under 35 U.S.C. 154(b) by 722 days.

(21) Appl. No.: 11/763,167

(22) Filed: Jun. 14, 2007

(65) Prior Publication Data
US 2008/0313567 A1 Dec. 18, 2008

(51) Int. Cl.
*G06F 3/048* (2013.01)

(52) U.S. Cl.
USPC ................. 715/811; 715/810; 715/846

(58) Field of Classification Search
USPC .......................... 715/810, 811, 846
See application file for complete search history.

(56) References Cited

U.S. PATENT DOCUMENTS

| | | | | |
|---|---|---|---|---|
| 5,367,626 | A * | 11/1994 | Morioka et al. | 715/837 |
| 5,564,004 | A * | 10/1996 | Grossman et al. | 715/835 |
| 6,377,286 | B1 * | 4/2002 | Hochmuth | 715/810 |
| 7,614,011 | B2 * | 11/2009 | Karidis et al. | 715/789 |
| 2005/0204198 | A1 * | 9/2005 | Pagan | 714/36 |
| 2006/0095864 | A1 * | 5/2006 | Mock et al. | 715/810 |
| 2006/0218499 | A1 * | 9/2006 | Matthews et al. | 715/765 |

* cited by examiner

*Primary Examiner* — Ting Lee
(74) *Attorney, Agent, or Firm* — Haynes and Boone, LLP (57) ABSTRACT

System and method for displaying an item on a display of a computer, wherein the item represents a file installed on the computer, are described. In one embodiment, the method comprises, responsive to a determination that a usage rate of the file exceeds a predetermined minimum rate, displaying the item representative of the file on the computer display; determining whether the usage rate of the file has changed; and responsive to a determination that the usage rate of the file has changed, updating at least one visual attribute of the item representative of the file to indicate the usage rate change.

15 Claims, 6 Drawing Sheets

FIG. 4B

SYSTEM AND METHOD FOR PROVIDING DYNAMIC PRIORITIZATION AND IMPORTANCE FILTERING OF COMPUTER DESKTOP ICONS AND PROGRAM MENU ITEMS

BACKGROUND

Computer users commonly use desktop icons to provide a quick and efficient method of launching application programs and storing important files. Typically, desktop icons are continually added until at some point, the collection of desktop icons will include icons that are no longer necessary, relevant, or as high a priority as they once were. The result is an over-crowded and cluttered desktop on which high priority icons are difficult to locate, thereby reducing productivity of the user.

In a similar manner, a computer system's program menu provides a quick and efficient method of locating and launching applications that reside on system. As with desktop icons, the program menu can become cluttered with menu items representing applications that are no longer necessary, relevant, or as high a priority as they once were, resulting in a program menu that is inefficient and difficult to navigate.

SUMMARY

One embodiment is a method for displaying an item on a display of a computer, the item representing a file installed on the computer, the file comprising a user file or an application file. The method comprises, responsive to a determination that a usage rate of the file exceeds a predetermined minimum rate, displaying the item representative of the file on the computer display; determining whether the usage rate of the file has changed; and, responsive to a determination that the usage rate of the file has changed, updating at least one visual attribute of the item representative of the file to indicate the usage rate change.

Another embodiment is a system for displaying an item on a display of a computer, the item representing a file installed on the computer, the file comprising a user file or an application file. The system comprises means responsive to a determination that a usage rate of the file exceeds a predetermined minimum rate for displaying the item representative of the file on a desktop of the computer; means for determining whether the usage rate of the file has changed; and means responsive to a determination that the usage rate of the file has changed for updating at least one visual attribute of the item representative of the file to indicate the usage rate change.

Yet another embodiment is a computer program product comprising a computer-readable medium having stored thereon computer-executable instructions for displaying an item on a display of the computer, the item representing a file installed on the computer, the file comprising a user file or an application file. The instructions comprise instructions responsive to a determination that a usage rate of the file exceeds a predetermined minimum rate for displaying the item representative of the file on a desktop of the computer; instructions for determining whether the usage rate of the file has changed; and instructions responsive to a determination that the usage rate of the file has changed for updating at least one visual attribute of the item representative of the file to indicate the usage rate change.

DETAILED DESCRIPTION

To better illustrate the advantages and features of the invention, a particular description of several embodiments will be provided with reference to the attached drawings. These drawings, and other embodiments described herein, only illustrate selected aspects of the invention and do not limit the invention's scope. Further, despite reference to specific features illustrated in the example embodiments, it will nevertheless be understood that these features are not essential to all embodiments and no limitation of the scope of the invention is thereby intended. Any alterations and further modifications in the described embodiments, and any further applications of the principles of the invention as described herein are contemplated as would normally occur to one skilled in the art. Furthermore, some items are shown in a simplified form, and inherently include components that are well known in the art. Further still, some items are illustrated as being in direct connection for the sake of simplicity and clarity. Despite the apparent direct connection, it is understood that such illustration does not preclude the existence of intermediate components not otherwise illustrated.

Figure 1:
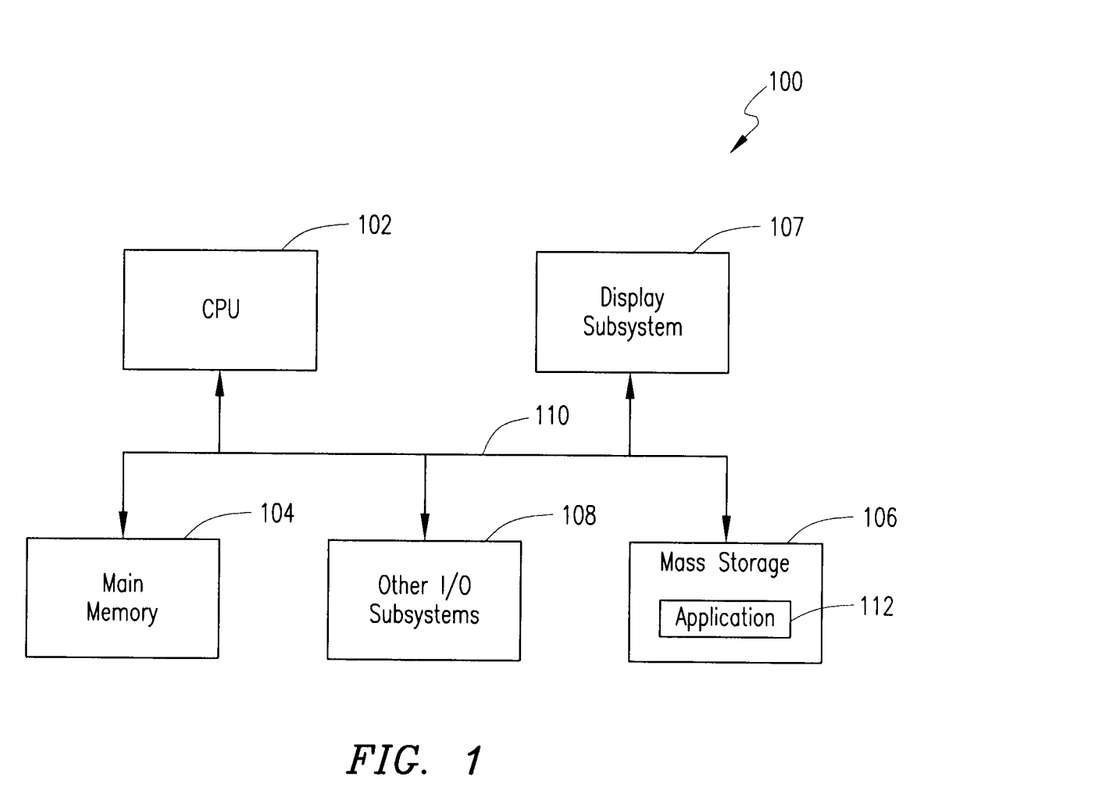
FIG. 1 is a block diagram of computer system in which an embodiment may be implemented.

FIG. 1 is a block diagram of a conventional computer system 100 in which a system for dynamic prioritization and importance filtering for desktop icons and program menu items in accordance with one embodiment may be implemented. As shown in FIG. 1, the computer system 100 includes a central processing unit ("CPU") 102, main memory 104, mass storage 106, a display subsystem 107, and other I/O subsystems, collectively designated by reference numeral 108, all interconnected via one or more buses, collectively represented in FIG. 1 by a bus 110. In one embodiment, as will be described in greater detail herein, an application 112 comprising computer program instructions for implementing the system for dynamic prioritization and importance filtering is installed on the computer 100.

Figure 2:
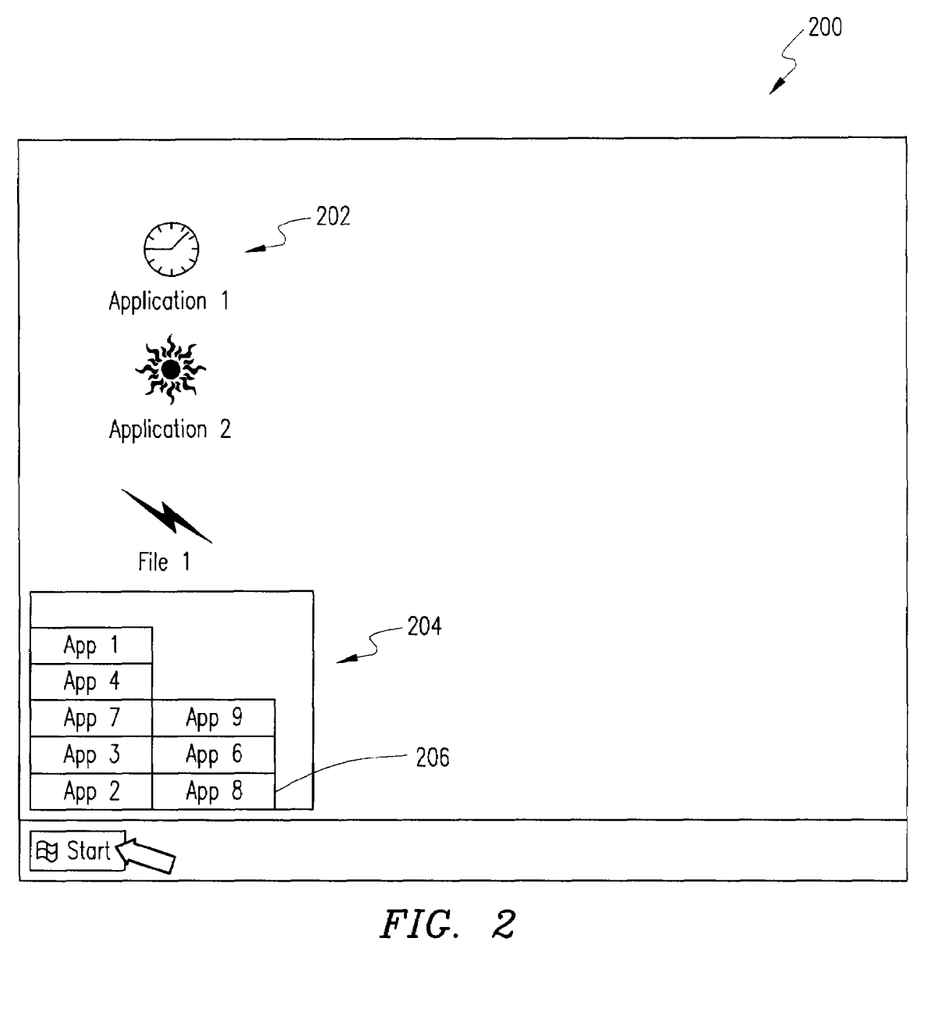
FIG. 2 illustrates a display of a desktop of a computer system such as the computer system of FIG. 1.

FIG. 2 illustrates a conventional desktop 200 that may be displayed on the display of a computer system, such as the computer system 100. As shown in FIG. 2, the desktop includes a plurality of desktop icon, such as a desktop icon 202, each of which corresponds to a file or application that may be opened by clicking on the icon. The desktop 200 also includes a program menu 204 comprising a plurality of menu items, such as a menu item 206, each of which corresponds to an application that may be opened by selecting the menu item.

In one embodiment, the dynamic prioritization and importance filtering system maintains data pertaining to the usage of certain application and program executables, as well as all user files. This feature is used to maintain the ability to dynamically create icons on the desktop, remove icons from the desktop, and update the appearance of icons on the desktop. As will be described in greater detail below, in accordance with an embodiment, as the frequency with which an application is executed or file is accessed increases, an icon representing the application or file will automatically be displayed on the desktop. Over time, as usage of the application or file increases, the appearance of the icon will change to become more and more conspicuous. Various visual attributes for increasing the visibility or conspicuousness of icons, such as color, font size and type, highlighting, icon size, and location on the desktop, may be specified by the user or defaults for these visual attributes may be used. In general, the more frequently an application or file is used, the more conspicuous its associated icon should be.

Conversely, as the frequency with which an application or file is used decreases, the icon associated therewith should become less conspicuous. Typically, this process will occur in an order the reverse of the process described above for making an icon more conspicuous. After some period of non-use of an application or file, the icon therefore will be removed from the desktop.

In one embodiment, each application or file has associated therewith an icon priority level and each icon priority level has associated therewith certain visual attributes used in displaying the icon representative of the application or file on the desktop. The icon priority level corresponds to a usage frequency of the application or file. For example, assuming that there are five icon priority levels, the set of visual attributes assigned to each may be as follows, although it will be understood that any number of other sets of features may be used to represent any number of icon priority levels:

| | |
|---|---|
| Level 5 | maximum icon size, maximum font size, maximum color brightness/glow |
| Level 4 | large icon size, large font size, warm color/glow |
| Level 3 | normal icon size, normal font size, normal color/glow |
| Level 2 | small icon size, small font size, dull color |
| Level 1 | minimum icon size, minimum font size, no color |

Figure 3A:
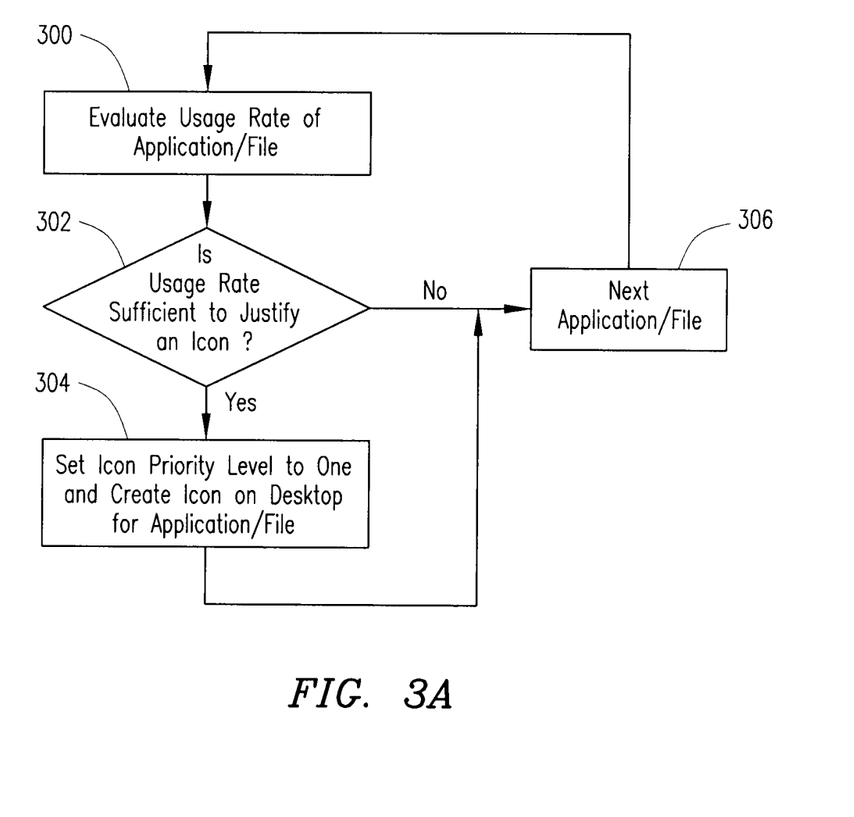
FIGS. 3A and 3B are flowcharts illustrating operation of the dynamic prioritization and importance filter for desktop icons, such as those illustrated in FIG. 2.
Figure 3B:
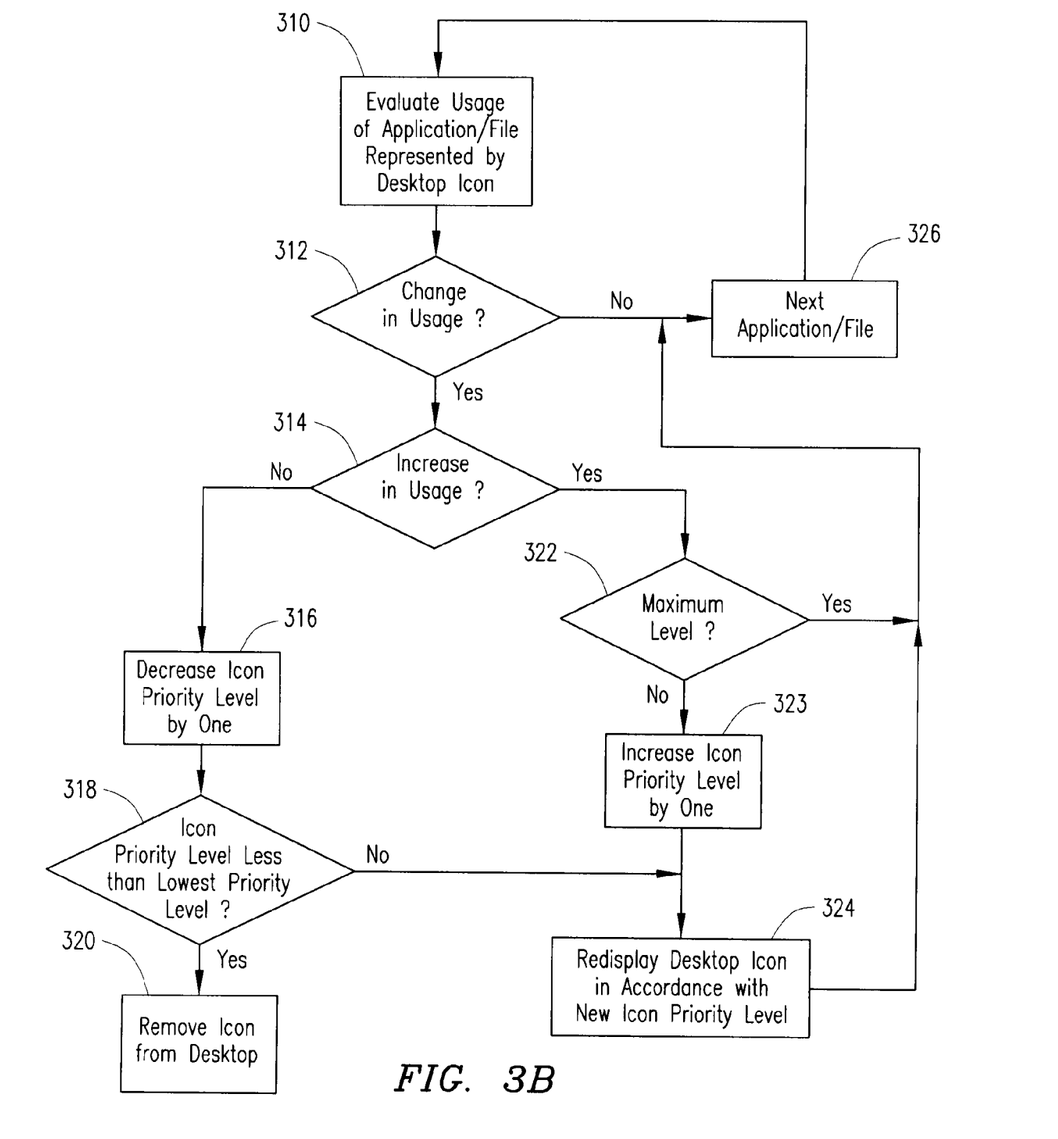

FIGS. 3A and 3B are flowcharts illustrating operation of the dynamic prioritization and importance filter for desktop icons, such as the icon 202. In particular, the process illustrated in FIG. 3A is performed periodically throughout operation of the computer on which the system is installed to determine when to add icons to the desktop. In step 300, the frequency with which an application or file is utilized (or its "usage rate") is evaluated. In step 302, a determination is made whether the usage rate of the application or file is sufficient to justify an icon. This determination may be made by comparing the usage rate of the application or file to some predetermined minimum usage rate, which may be a system default or may be configurable by a user. If it is determined that the usage rate of the application or file is sufficient to justify an icon, in step 304, an icon priority level of "1" is assigned to the application or file and an icon is created on the desktop for the application or file with visual attributes in accordance with icon priority level 1; otherwise, in step 306, the next application or file is identified and execution returns to step 300.

Referring now to FIG. 3B, the process illustrated therein is performed periodically throughout operation of the computer on which the system is installed to determine when to change the appearance of icons displayed on the desktop. In step 310 the usage rate of an application or file represented by a first icon on the desktop is evaluated. In step 312, a determination is made whether the usage rate of the application or file, as tracked by the application 12, has changed by a predetermined amount. If it is determined in step 312 that the usage rate has changed by a predetermined amount, in step 314, a determination is made whether the usage rate has increased. If in step 314 it is determined that usage rate of the application or file has not increased (i.e., has decreased), in step 316, the icon priority level of the application or file is decreased by one. In step 318, a determination is made whether the icon priority level of the application or file has been decreased to zero. If so, in step 320, the icon is removed from the desktop.

If in step 314 it is determined that the usage rate has increased, in step 322, a determination is made whether the icon priority level is at a maximum. If not, in step 323, the icon priority level of the application or file is increased by one and in step 324, the icon representing the application or file is redisplayed in accordance with its new icon priority level. Similarly, if in step 318 it is determined that the icon priority level of the application or file has not been decreased to zero, execution proceeds to step 324. Subsequent to the redisplaying of the icon in step 324, execution proceeds to step 326, in which the next application or file is identified, and then returns to step 310. Similarly, if in step 322 it is determined that the icon priority level is at a maximum, execution proceeds to step 326.

In one embodiment, each application or file also has associated therewith a menu item priority level and each menu item priority level has associated therewith certain visual attributes used in displaying the icon representative of the application or file on the desktop. The menu item priority level corresponds to a usage frequency of the application or file. For example, assuming that there are five menu item priority levels, the set of visual attributes assigned to each may be as follows, although it will be understood that any number of other sets of features may be used to represent any number of menu item priority levels:

| | |
|---|---|
| Level 5 | maximum icon size, maximum font size, maximum color brightness/glow |
| Level 4 | large icon size, large font size, warm color/glow |
| Level 3 | normal icon size, normal font size, normal color/glow |
| Level 2 | small icon size, small font size, dull color |
| Level 1 | minimum icon size, minimum font size, no color |

Figure 4A:
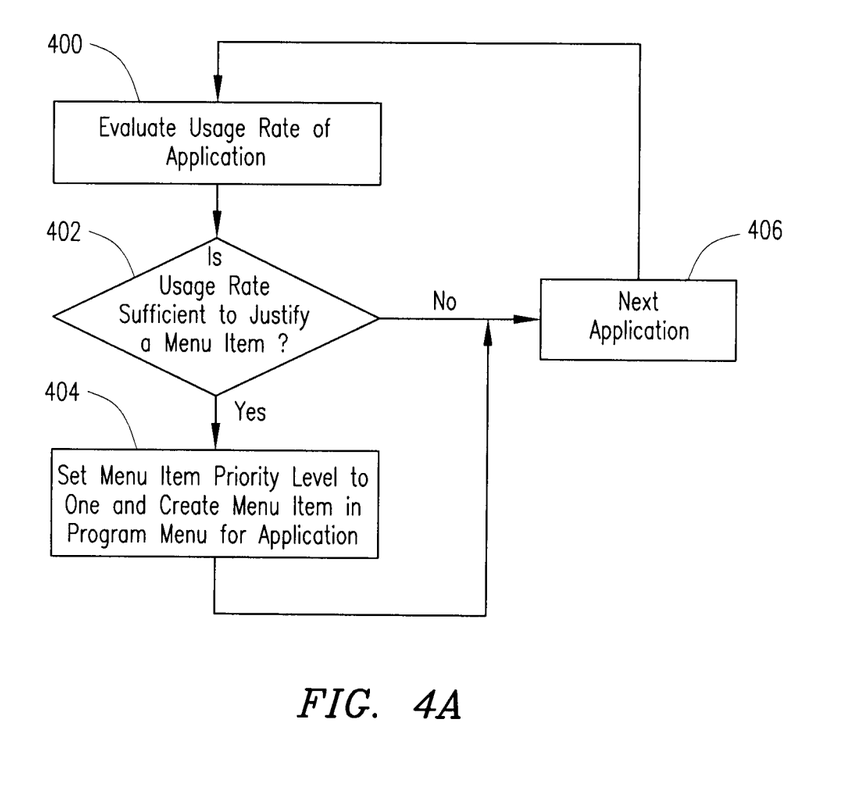
FIGS. 4A and 4B are flowcharts illustrating operation of the dynamic prioritization and importance filter for program menu items, such as those illustrated in FIG. 2.
Figure 4B:
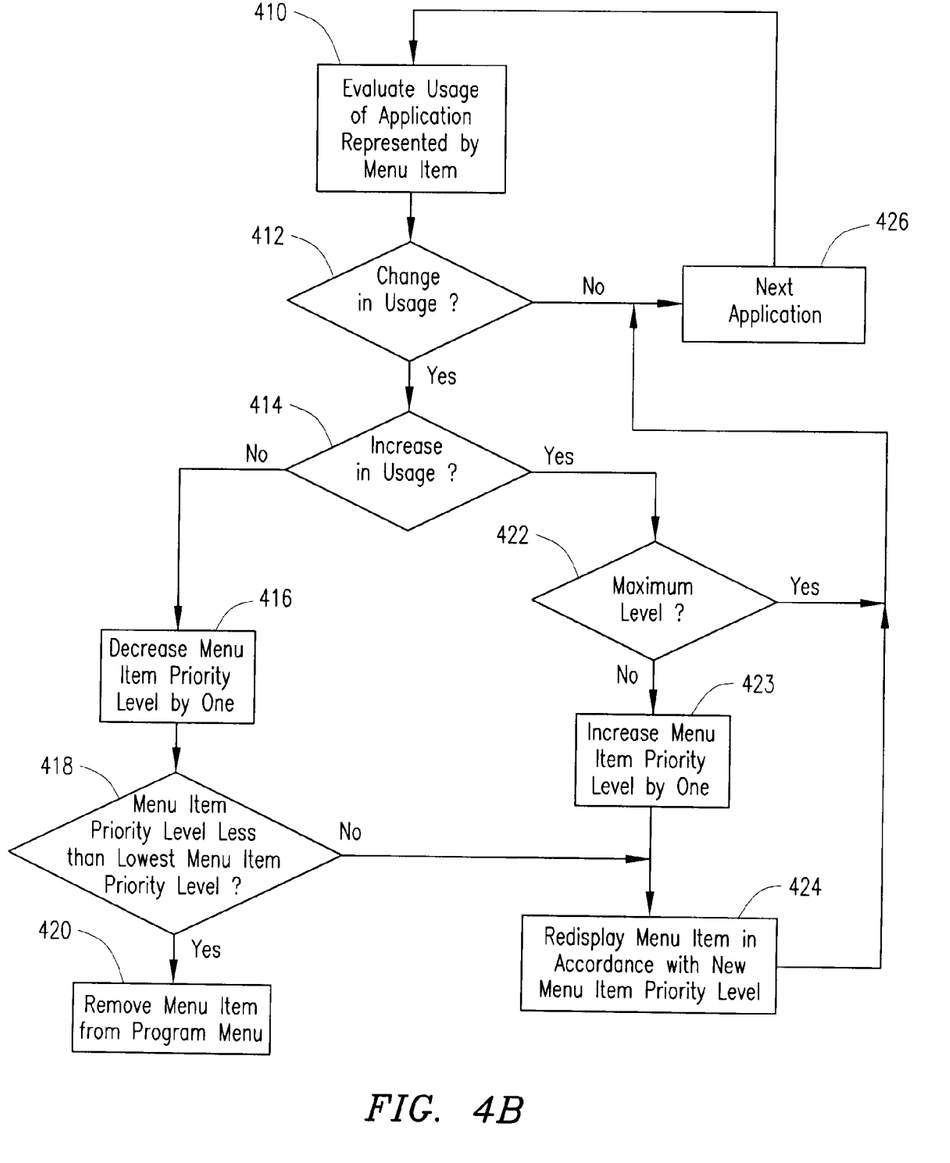

FIGS. 4A and 4B are flowcharts illustrating operation of the dynamic prioritization and importance filter for program menu items, such as the program menu item 206. It will be noted that the processes illustrated in FIGS. 4A and 4B for program menu items are substantially similar to those illustrated in FIGS. 3A and 3B, respectively, for desktop icons. In particular, the process illustrated in FIG. 4A is performed periodically throughout operation of the computer on which the system is installed to determine when to add items to the program menu. In step 400, the frequency with which an application or file is utilized (or its "usage rate") is evaluated. In step 402, a determination is made whether the usage rate of the application or file is sufficient to justify a program menu item. This determination may be made by comparing the usage rate of the application or file to some predetermined minimum usage rate, which may be a system default or may be configurable by a user. If it is determined that the usage rate of the application or file is sufficient to justify a program menu item, in step 404, a menu item priority level of "1" is assigned to the application or file and an item is created on the program menu for the application or file with visual attributes in accordance with icon priority level 1; otherwise, in step 406, the next application or file is identified and execution returns to step 400.

Referring now to FIG. 4B, the process illustrated therein is performed periodically throughout operation of the computer on which the system is installed to determine when to change the appearance of items displayed in the program menu. In step 410 the usage rate of an application or file represented by a first item in the program menu is evaluated. In step 412, a determination is made whether the usage rate of the application or file, as tracked by the application 12, has changed by a predetermined amount. If it is determined in step 412 that the usage rate has changed by a predetermined amount, in step 414, a determination is made whether the usage rate has increased. If in step 414 it is determined that usage rate of the application or file has not increased (i.e., has decreased), in step 416, the menu item priority level of the application or file is decreased by one. In step 418, a determination is made whether the menu item priority level of the application or file has been decreased to zero. If so, in step 420, the item is removed from the program menu.

If in step 414 it is determined that the usage rate has increased, in step 422, a determination is made whether the menu item priority level is at a maximum. If not, in step 423, the menu item priority level of the application or file is increased by one and in step 424, the item representing the application or file is redisplayed in the program menu in accordance with its new menu item priority level. Similarly, if in step 418 it is determined that the menu item priority level of the application or file has not been decreased to zero, execution proceeds to step 424. Subsequent to the redisplaying of the icon in step 424, execution proceeds to step 426, in which the next application or file is identified, and then returns to step 410. Similarly, if in step 422 it is determined that the menu item priority level is at a maximum, execution proceeds to step 426.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A method for displaying an item on a display of a computer, the item representing a file installed on the computer, the file comprising a user file or an application file, the method comprising:
    after using the file, increasing a usage rate of the file;
    comparing the usage rate of the file to a predetermined minimum rate;
    determining, based on the compare, whether the usage rate of the file exceeds the predetermined minimum rate, wherein when the usage rate of the file is determined to exceed the predetermined minimum rate the item representative of the file is displayed on the computer display, and wherein when the usage rate of the file is determined not to exceed the predetermined minimum rate the item representative of the file is not displayed on the computer display;
    displaying the item representative of the file as a desktop icon and as a program menu selection of a Start menu on the computer display, responsive to determining that the usage rate of the file exceeds the predetermined minimum rate;
    determining whether the usage rate of the file has changed;
    responsive to a determination that the usage rate of the file has changed, updating at least one visual attribute of the item representative of the file to indicate the usage rate change;
    wherein the updating at least one visual attribute comprises changing at least one of a font size, an icon size, a font color, and a brightness of both the desktop icon and the program menu selection.

2. The method of claim 1 further comprising, responsive to a determination that a usage rate of the file exceeds a predetermined minimum rate, assigning a minimum priority level to the file.

3. The method of claim 2 wherein the updating at least one visual attribute of the item representative of the file further comprises:
    determining whether the usage rate change comprises a usage rate increase;
    responsive to a determination that the usage rate change comprises a usage rate increase, increasing the priority level of the file and redisplaying the item using a set of visual attributes associated with the increased priority level; and
    responsive to a determination that the usage rate change comprises a usage rate decrease, decreasing the priority level of the file and redisplaying the item using a set of visual attributes associated with the decreased priority level.

4. The method of claim 1 wherein the updating at least one visual attribute includes using a priority level scheme including multiple levels.

5. The method of claim 4 wherein the multiple levels include:
    a level having a least priority; and
    a level having a greatest priority,
    wherein the level having the least priority includes a minimum font size, a minimum icon size, and a minimum color brightness, and
    wherein the level having the greatest priority includes a maximum font size, a maximum icon size, and a maximum color brightness.

6. A system for displaying an item on a display of a computer, the item representing a file installed on the computer, the file comprising a user file or an application file, the system comprising:
    the computer including a processor operable to perform:
        increasing a usage rate of the file after the file has been used;
        comparing the usage rate of the file to a predetermined minimum rate;
        determining, based on the compare, whether the usage rate of the file exceeds the predetermined minimum rate, wherein when the usage rate of the file is determined to exceed the predetermined minimum rate the item representative of the file is displayed on the computer display, and wherein when the usage rate of the file is determined not to exceed the predetermined minimum rate the item representative of the file is not displayed on the computer display;
        displaying the item representative of the file as an icon of a desktop and as a program menu selection of a Start menu of the computer display, responsive to determining that the usage rate of the file exceeds the predetermined minimum rate;
        determining whether the usage rate of the file has changed; and
        responsive to a determination that the usage rate of the file has changed for updating at least one visual attribute of the item representative of the file to indicate the usage rate change;
        and wherein updating at least one visual attribute comprises changing at least one of a font size, an icon size, a location in the program menu display, and a brightness of both the desktop icon and the program menu selection.

7. The system of claim 6 further comprising responsive to a determination that a usage rate of the file exceeds a predetermined minimum rate for assigning a minimum priority level to the file.

8. The system of claim 7 wherein updating at least one visual attribute of the item representative of the file further comprises:
   determining whether the usage rate change comprises a usage rate increase;
   responsive to a determination that the usage rate change comprises a usage rate increase for increasing the priority level of the file and redisplaying the item using a set of visual attributes associated with the increased priority level; and
   responsive to a determination that the usage rate change comprises a usage rate decrease for decreasing the priority level of the file and redisplaying the item using a set of visual attributes associated with the decreased priority level.

9. The system of claim 6 wherein updating at least one visual attribute includes using a priority level scheme including multiple levels.

10. The system of claim 9 wherein the multiple levels include:
    a level having a least priority; and
    a level having a greatest priority,
    wherein the level having the least priority includes a minimum font size, a minimum icon size, and a minimum color brightness, and
    wherein the level having the greatest priority includes a maximum font size, a maximum icon size, and a maximum color brightness.

11. A computer program product comprising a non-transitory computer-readable storage medium having stored thereon computer-executable instructions for displaying an item on a display of the computer, the item representing a file installed on the computer, the file comprising a user file or an application file, the instructions comprising:
    instructions for increasing a usage count of the file to a first value;
    instructions for comparing the first to a predetermined minimum;
    instructions for determining, based on the compare, whether the first value exceeds the predetermined minimum value, wherein when the first value is determined to exceed the predetermined minimum value the item representative of the file is displayed on the computer display, and wherein when the first value is determined not to exceed the predetermined minimum value the item representative of the file is not displayed on the computer display;
    instructions for displaying the item representative of the file as an icon of a desktop and as a program menu selection of a Start menu of the computer display, responsive to determining that the first value exceeds the predetermined minimum value;
    instructions for determining whether the usage count of the file has changed; and
    instructions responsive to a determination that the usage count of the file has changed for updating at least one visual attribute of both the desktop icon and the program menu selection.

12. The computer program product of claim 11 wherein the instructions further comprise instructions responsive to a determination that a value of the usage count of the file exceeds a predetermined minimum value for assigning a minimum priority level to the file.

13. The computer program product of claim 12 wherein the instructions for updating at least one visual attribute of the item representative of the file further comprise:
    instructions for determining whether the usage count change comprises a usage count increase;
    instructions responsive to a determination that the usage count change comprises a usage count increase for increasing the priority level of the file and redisplaying the item using a set of visual attributes associated with the increased priority level; and
    instructions responsive to a determination that the usage count change comprises a usage count decrease for decreasing the priority level of the file and redisplaying the item using a set of visual attributes associated with the decreased priority level.

14. The computer program product of claim 11 wherein the instructions for updating at least one visual attribute includes using a priority level scheme including multiple levels.

15. The computer program product of claim 14 wherein the multiple levels include:
    a level having a least priority; and
    a level having a greatest priority,
    wherein the level having the least priority includes a minimum font size, a minimum icon size, and a minimum color brightness, and
    wherein the level having the greatest priority includes a maximum font size, a maximum icon size, and a maximum color brightness.

* * * * *